(No Model.)

J. W. ELLIS.
COMPOSITION OF MATTER FOR THE PRESERVATION OF PAPER OR VEGETABLE TUBING USED FOR THE INSULATION OF TELEGRAPH WIRES.

No. 319,079. Patented June 2, 1885.

United States Patent Office.

JAMES W. ELLIS, OF BROOKLYN, N. Y., ASSIGNOR OF TWO-THIRDS TO JOSIAH W. PARKER, OF SAME PLACE, AND HENRY D. HARRIS, OF NEW YORK, N. Y.

COMPOSITION OF MATTER FOR THE PRESERVATION OF PAPER OR VEGETABLE TUBING USED FOR THE INSULATION OF TELEGRAPH-WIRES.

SPECIFICATION forming part of Letters Patent No. 319,079, dated June 2, 1885.

Application filed March 9, 1885. (No specimens.)

*To all whom it may concern:*

Be it known that I, JAMES W. ELLIS, a citizen of the United States, residing at Brooklyn, in the county of Kings and State of New York, have invented a new and useful Composition of Matter for the Preservation of Paper or Vegetable Tubing used for the Insulation of Telegraph-Wires, &c., of which the following are the ingredients: asphaltum, forty sixty-fourths part; resin, fourteen sixty-fourths part; petroleum or dead oil, six sixty-fourths part; vulcanized rubber, three sixty-fourths part; sulphur, one sixty-fourth part.

In making my composition the asphaltum, which is the natural kind, is boiled till at 350° Fahrenheit it becomes perfectly liquefied. If now the matter were poured on any substance except iron, steel, and the hardy substances, it would instantly destroy them, and if allowed to cool it would again become solid, and could not be poured over the wires sought to be protected.

To thin the asphaltum and keep it from becoming solid, I use petroleum or dead oil, which is stirred into the asphaltum.

The resin is added to make the substance brittle when cold, and thus easily cracked to pieces. The vulcanized rubber and sulphur are added, the former to make the substance tenacious and hold together, and the latter to keep the asphaltum when at such a great heat from foaming, and thus leaving air-holes while it is cooling off.

If required, marble dust, bone-black, or saw-dust may be used in order to make the substance cool rapidly when once applied.

Lime may be added in very small quantities, about one-half as much in quantity as rubber used, in order to make the composition harder.

This composition of matter as thus formed is adapted to be poured around paper tubing used as an insulator for telegraph-wire when placed under ground, as shown in the accompanying drawings, in which—

Figure 1:
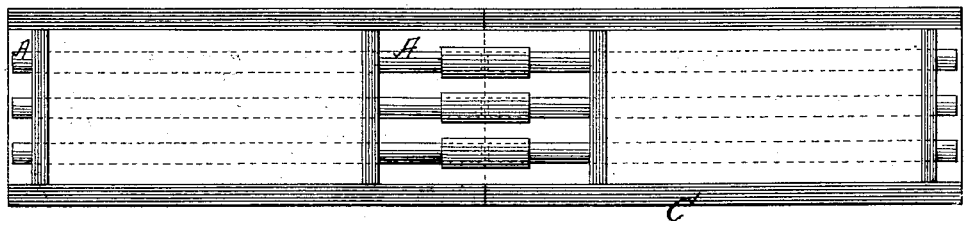
Figure 2:
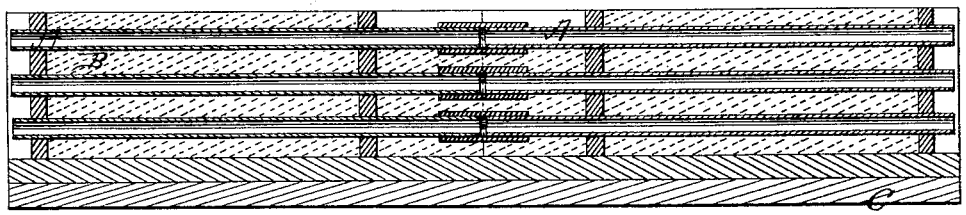
Figure 3:
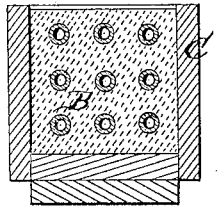

Figure 1 is a plan view, Fig. 2 a vertical longitudinal section, and Fig. 3 a vertical cross-section.

A is the tubing, made of pasteboard, B the composition, and C the box containing all.

It will be seen that asphaltum when in its liquid state, requiring a great heat to liquefy it, would soon destroy the tubing A, so that it is necessary to lessen its heat and yet continue its fluidity so as to run. For this purpose, as stated above, I use the petroleum or dead oil.

The ingredients must all be thoroughly mixed by stirring while heated.

What I claim, and desire to secure by Letters Patent, is—

The herein-described composition of matter to be used for the preservation of paper or vegetable tubing used as insulators for telegraph-wires, &c., consisting of asphaltum, resin, petroleum, vulcanized rubber, and sulphur in the proportions specified.

JAS. W. ELLIS.

Witnesses:
THOS. O. ELLIS,
CHAS. R. CLARKE.